May 7, 1957 B. B. MORTON ET AL 2,791,096
PROTECTIVELY SHEATHED STRUCTURE EXPOSED TO SEA WATER
Filed July 24, 1953 2 Sheets-Sheet 2

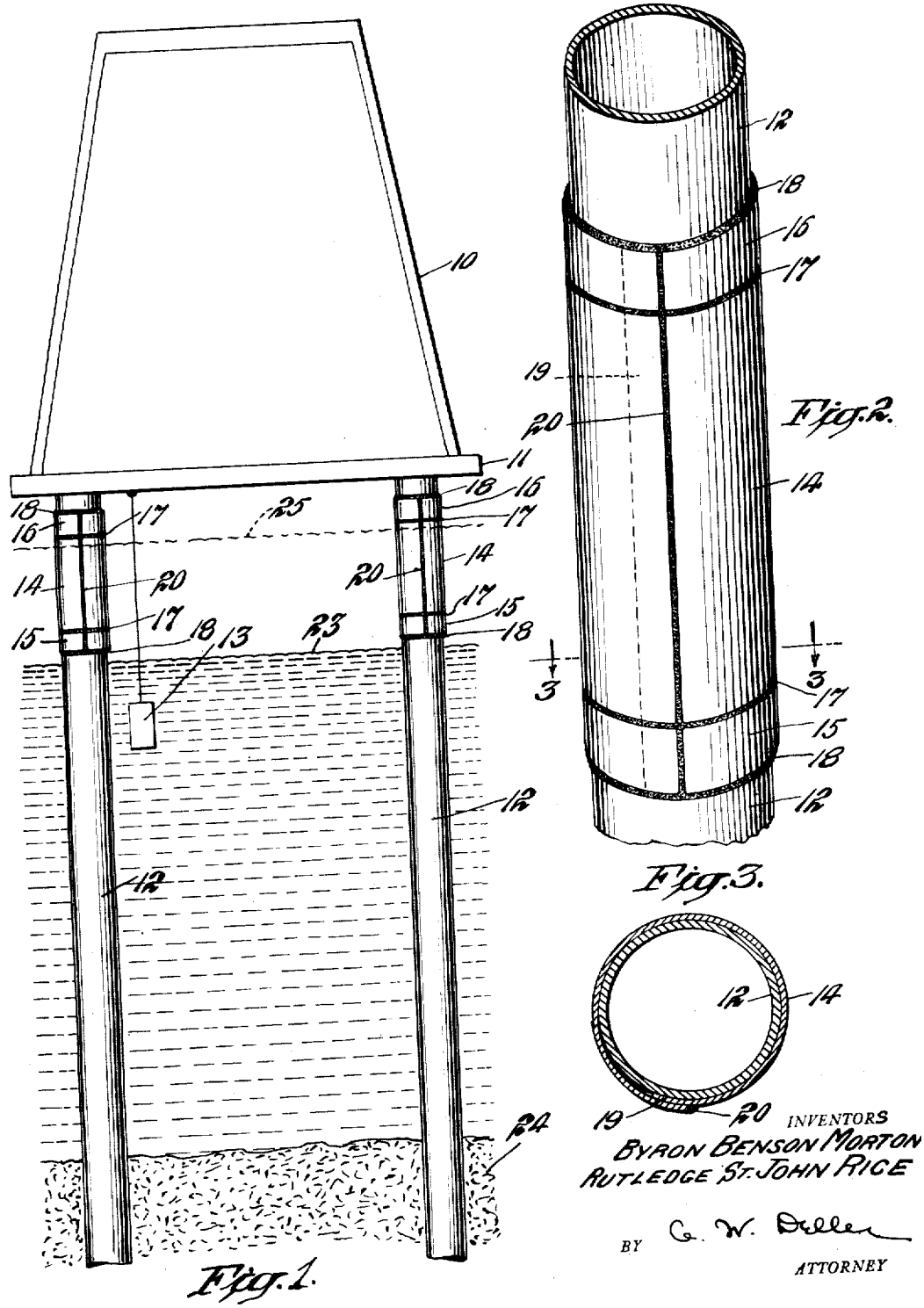

INVENTORS
BYRON BENSON MORTON
RUTLEDGE ST. JOHN RICE

BY C. W. Deller
ATTORNEY

United States Patent Office 2,791,096
Patented May 7, 1957

2,791,096

PROTECTIVELY SHEATHED STRUCTURE EXPOSED TO SEA WATER

Byron Benson Morton, Elizabeth, N. J., and Rutledge St. John Rice, Houston, Tex., assignors to The International Nickel Company, Inc., New York, N. Y., a corporation of Delaware Application July 24, 1953, Serial No. 369,982

4 Claims. (Cl. 61—54)

The present invention relates to the protection from corrosion of structures exposed to a salt water environment, and more particularly to the protection of steel structures, such as steel pilings, standing partially immersed in sea water from salt water corrosion by attaching a protective corrosion-resistant metal sheathing in the low-tide to high-tide area and including also the high-tide splash area above the high-tide line.

It is well known that steel structures such as steel pilings standing partially immersed in sea water need three kinds of protection against the corrosive effects of salt air, water and spray. For surfaces below low tide, cathodic protection is used. No special problem is involved here, particularly if magnesium anodes are suspended from the steel structure and immersed in the sea water. For high parts of the structure that the waters do not reach, paint and other organic coatings supply adequate protection. Again there is no problem involved. However, in the third area—the tidal and splash zones—the problem of corrosion is particularly acute and there is need for entirely different protective means. In this zone there is always sufficient salt water to stimulate corrosion, yet too little to enable continuous protection by cathodic methods. Although paints and coatings can be applied before the structure is erected, it is not an easy job to renew them even in quiet waters. Furthermore, paints and coatings, such for example as metal paints and asphalt coatings, have not provided an entirely satisfactory protection in this third area, namely, the low-tide to high-tide splash areas. It has been proposed to cover the steel piling or other steel structure in the aforementioned tidal and splash zones with a protective sheathing of a metal that is resistant to corrosion by sea water. However, during the installation of the protective metal sheathing of a suitable sea water corrosion-resistant metal upon steel structures standing in sea water, or sea water environment, as for example, oil-drilling structures, pilings of piers and other structures, and supports of structures in general, there has been considerable difficulty in attaching a suitable sea water corrosion-resistant metal sheathing directly to the steel structure by welding since the special welds that would be necessary are more difficult to manipulate than a conventional steel weld rod. It is difficult, if not impossible, to make such welds when, as is frequently the case, the welding has to be performed under submerged conditions. This is particularly true when attempts have been made to weld the protective metal sheathing to existing, rusty, steel structures. Furthermore, considerable difficulty has been experienced in welding many of the suitable protective-sheathing materials to the steel structure without having the sheathing material crack during the installation as a result of contamination due to metals such as zinc, lead, or mercury being drawn from previous paint or other protection which has not been removed from the steel structure. Although many attempts were made to overcome the foregoing difficulties and other disadvantages, none, as far as we are aware, was entirely successful when carried into practice commercially on an industrial scale.

It has now been discovered that the aforementioned difficulties can be overcome and a sea water corrosion-resistant metal sheathing can be readily and efficiently attached to the steel piling or other structure by means of steel bands welded to the metal sheathing and also welded to the steel piling or other steel structure. Thus, the sea water corrosion-resistant metal sheathing is not directly attached to the steel piling or other steel structure.

It is an object of the present invention to provide for protection of steel structures standing in sea water, or sea water environment, from corrosion in the low-tide to high-tide splash areas.

Another object of the invention is to provide a method of installing a protective, sea water corrosion-resistant metal sheathing on steel piling or other steel structure standing in sea water, or sea water environment.

The invention also contemplates providing a highly efficient method for joining to steel pilings a protective metal sheathing made of a nickel-copper alloy containing 20% to 40% copper, whereby the steel piling may be protected from corrosion by sea water in the low-tide to high-tide splash areas.

The invention further contemplates providing a steel piling or other steel structure having a corrosion-resistant metal sheathing indirectly attached to the steel piling or other structure to protect the low-tide to high-tide splash area of the steel structure.

Other objects and advantages will become apparent from the following description taken in conjunction with the accompanying drawings in which:

Figure 1 is an end view showing a steel pier or other steel structure supported on steel piling that is protectively sheathed in the critical low-tide to high-tide splash areas in accordance with this invention;

Fig. 2 depicts a perspective view of the critical area of one of the steel piles of Fig. 1;

Fig. 3 shows a sectional view of the steel pile of Fig. 2 taken on the line 3—3 of Fig. 2;

Figure 4:
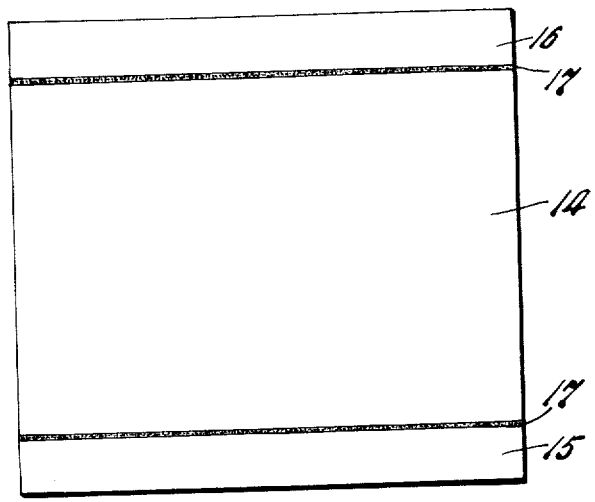
Fig. 4 is a plan view of a corrosion-resistant metal sheet with steel strips or bands welded thereto prior to installation on the steel piling of Fig. 2.

Generally speaking, the present invention contemplates sheathing the critical low-tide to high-tide splash area of a steel piling or other steel structure standing in sea water, or sea water environment, with a suitable metal sheet that is resistant to corrosion by sea water by pre-welding a steel band to the corrosion-resistant metal sheet and then welding the steel band to the steel structure. Conversely, the steel band may be first welded in position on the steel structure to be protected and the corrosion-resistant metal sheet then welded to the steel band.

The protective sheathing is made from a metal that is resistant to corrosion by sea water. Metals that are known to be resistant to corrosion by sea water and which therefore may be used for the protective sheathing are nickel; nickel-copper alloys including the alloy sold under the trade name "Monel" (approximately comprises nickel and 20% to 40% copper); copper-nickel alloys including 70% copper–30% nickel and 90% copper–10% nickel; stainless steels and corrosion-resistant alloys as Hastelloy "C" (a nickel alloy containing up to 20% Mo, up to 18% cr, up to 6% W, and up to 7% Fe); copper; and copper-zinc alloys as Admiralty metal (at least 70% Cu and balance substantially zinc). A composite nickel-clad ferrous sheet metal has been used effectively for the protective sheathing. In the installation of the protective sheathing on the steel structures standing in sea water or sea water environment, such as oil-drilling structures, piling of piers and other structures, and supports of structures in general, the attachment can be most readily and efficiently made when the steel bands in accordance with this invention are employed for the attaching of the sheathing to the structure. The use of the steel bands permits use of steel welding wires for attaching the bands to the steel structure. This offers advantages from the standpoint of position welding as well as other advantages and facilitates welding to the steel structure under submerged conditions. By attaching the sheathing to the steel bands and then in turn welding the steel bands to the steel structure, danger of cracking many of the sheathing materials as a result of the metals such as zinc, lead or mercury being drawn from previous paint or other protection is avoided. In particular, due to the tendency of lead, zinc and mercury and the other materials that may exist in paints normally applied to structures, a nickel-copper alloy such as that sold under the trade name "Monel" would be prone to crack if directly welded to a piece of steel that had been so painted unless the paint within the weld area had been completely removed. It would be nearly impossible to completely remove the paint from an old structure. Hence, the danger lurks that a "Monel" sheathing would be ruined when it is attempted to attach it by directly welding it to the steel structure.

In carrying the invention into practice it is preferred to make the protective metal sheathing-sheet out of a nickel-copper alloy sold under the trade name "Monel" which contains approximately 20% to 40% nickel. The embodiments shown in the drawing will be described by way of example in connection with a "Monel" protective sheathing.

Figure 1 of the drawing shows a steel structure on steel pilings standing partially immersed in sea water. The structure has a conventional superstructure 10 which may be an oil drilling or oil well structure. The superstructure 10 is supported on a horizontal steel platform 11. The platform 11 in turn is supported on and is electrically connected to the steel pilings 12. An anode 13 is immersed in the sea water and is suspended from and electrically connected to the steel platform 11 by a cable whereby the surfaces of the pilings 12 below low tide are given cathodic protection aginst sea water corrosion. The pilings 12 may be of a cylindrical shape as shown in the drawing or may be H-beams or structural members of other conventional shapes. Each steel piling 12 is protected aginst sea water corrosion in the tidal and splash zones extending from shortly above low tide, for example, the mean low tide level 23, up through the upper level 25 of the splash area above the high tide level by a "Monel" sheet 14 as indicated in Fig. 1. The protective structure is shown in detail in Fig. 2. "Monel" sheets 7 or 8 feet high and of 0.050 inch and 0.062 inch thickness have been used successfully. The "Monel" sheet as shown in Fig. 4 has steel bands 16 and 15 butt-welded at 17 to the upper and lower edges thereof. The sheet is then curved and sprung into place around the piling with the vertical edges overlapping as indicated at 19. The upper and lower edges of the steel bands 15 and 16 respectively, are then welded to the steel piling as indicated at 18. The vertical ends of the "Monel" sheet are then lap-welded as indicated at 20.

While the drawing shows the provision of upper and lower connecting steel bands 15 and 16, in actual practice in certain instances it has been found sufficient to use only the lower steel band 15. In other words, the upper steel band 16 has been omitted without any detrimental effects on the resistance to corrosion by the sea water. Cathodic protection of the piling actually extends above low water mark due to water absorption by attached marine growths making it unnecessary to extend the protective "Monel" sheathings below the water. The steel band permits safe and certain attachment of the protective sheathing to the steel structure exposed to sea water. One of the reasons for using a steel strip as a connecting ring between "Monel" sheathing and the steel piling is that it is not at present commercially feasible to weld "Monel" to steel under water.

This invention is concerned mainly with protection of existing equipment that has been exposed for some time to sea conditions but it is also applicable to new structures. Furthermore, the "Monel" sheathing can be added to structures already in the water as hereinbefore described or it can be applied on land when the structure is being built before assembly of the structure in the sea water. If necessary, the steel band 15 can be welded to the steel piling 12 under submerged conditions.

In welding "Monel" to "Monel," and "Monel" to steel, nickel-copper alloy weld rods are used such as, for example, the coated nickel-copper weld rod of the Kihlgren, Pease and LeGrand U. S. Patent No. 2,520,806. These weld rods are not as flexible in the hands of the average welder as are some of the steel welding rods. This applies especially to welding in other than "down-hand" direction. Thus, by the use of steel bands the final attachment of the "Monel" metal sheathing to the steel piling or other structure can be made using the conventional steel electrode for the girth seams 18. A nickel-copper alloy electrode such as disclosed in the aforementioned U. S. Patent No. 2,520,806 would be used on the "Monel" to steel weld 17 and also on the vertical seam weld 20. Thus, the steel band 15, together with the steel band 16 if used, would be attached to the "Monel" sheet 14 by welding in "down-hand" position using the weld rod disclosed in the aforementioned U. S. Patent No. 2,520,806. We visualize that the sheathing so formed would then be rolled or otherwise formed to the approximate shape of the steel member to be protected. The sheathing 14 would then be sprung into place on the steel piling 12 and the steel bands attached to the steel structure by a girth weld made using steel electrodes. The vertical ends of the metal sheathing 14 will then be welded together by a vertical weld using a nickel-copper alloy electrode.

Some fabricators might prefer to weld the steel strip 15 on the steel member of the structure to be protected and subsequently apply the "Monel" sheathing to the structure and then weld the "Monel" sheathing to the steel strip using a nickel-copper alloy electrode. This modification comes within the scope of our invention.

Figure 6:
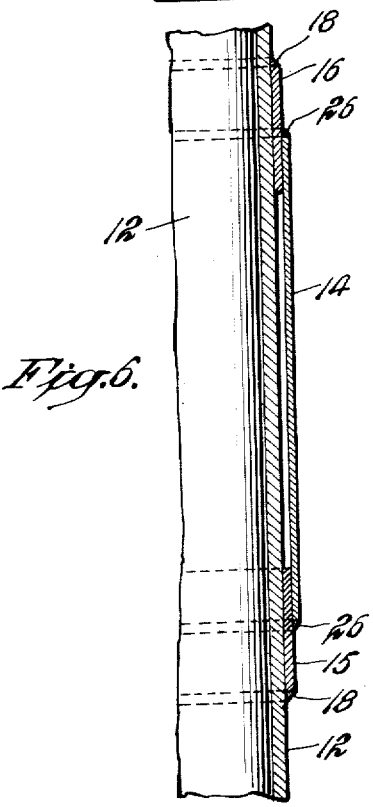
Fig. 6 is a sectional view similar to Fig. 5 and showing the steel bands attached to the corrosion-resistant metal sheet by a lap weld.
Figure 5:
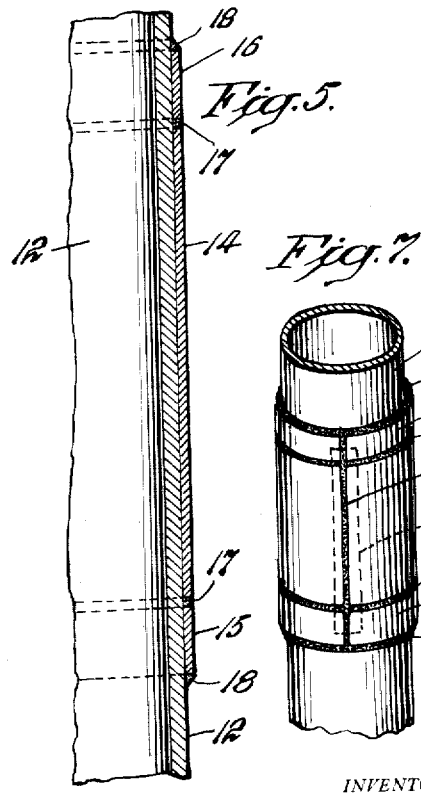
Fig. 5 is a sectional view of a portion of the steel pile of Fig. 2, showing the butt-welded joints between the steel bands and the corrosion-resistant metal sheet.

Fig. 6 of the drawing illustrates a variation in the attachment of the steel bands to the protective metal sheathing. In this embodiment the sheet of protective metal sheathing 14 is attached to the steel band or bands by means of a lapweld 26.

Figure 7:
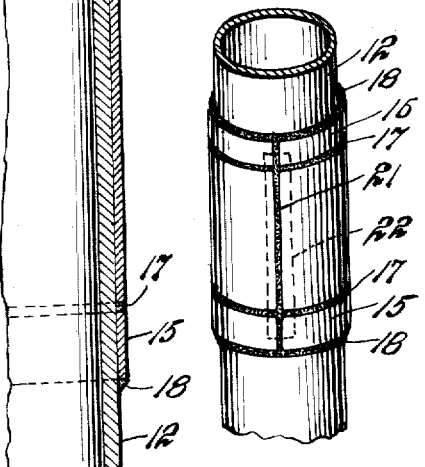
Fig. 7 is a view similar to Fig. 2, but depicting another embodiment of the attachment of the protective sheathing to a steel pile.

Fig. 7 of the drawing illustrates a further embodiment of the invention in which the sheet of protective metal sheathing 14 is assembled in position around the steel piling or other structure to be protected with the vertical edges of the sheet abutting at 21 and with a steel strip 22 between the aforesaid abutting edges and the steel piling or structure. The abutting edges will then be welded together by a butt-weld using a nickel-copper alloy electrode. The steel strip 22 prevents contamination of the butt-weld seam by lead, zinc, mercury and the other elements that may exist in paints normally applied to structures to be exposed to sea conditions. Thus, the butt-welded joint is protected from cracking due to any such contamination.

The present invention has wide applicability to the protection from corrosion by sea water of structures exposed to sea water environment and, in particular, to the protection of steel structures standing partially immersed in sea water such as steel pilings of piers and other structures, oil-loading piers, off-shore oil well developments such as oil drilling structures and oil wells and supports of structures in general.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A steel structure supported on steel piles standing partially immersed in sea water and cathodically protected from corrosion by the sea water below low tide by an anode electropositive to the steel structure, said steel piles each having a sheathing formed of a sheet of a nickel-copper alloy containing 20% to 40% nickel, the said nickel-copper sheet extending around the steel pile with vertical ends welded together, the sheet extending vertically at least from the mean low-tide level up through the splash zone above the high-tide level, a steel band encircling each steel pile and butt-welded to the bottom edge of the nickel-copper alloy sheet, said steel band also being welded to the steel pile, whereby the nickel-copper alloy sheet is indirectly attached to the steel pile.

2. A steel structure supported on steel piles standing partially immersed in sea water and cathodically protected from corrosion by the sea water below low tide by an anode electropositive to the steel structure, said steel piles each having a sheathing formed of a sheet of a nickel-containing metal resistant to corrosion by sea water, the said nickel-containing metal extending around the steel pile with vertical ends welded together, the sheet extending vertically at least from the mean low-tide level up through the splash zone above the high-tide level, a steel band encircling each steel pile and butt-welded to the bottom edge of the nickel-containing metal sheet, said steel band also being welded to the steel pile, whereby the nickel-containing metal sheet is indirectly attached to the steel pile.

3. A steel structure supported on steel piles standing partially immersed in sea water and cathodically protected from corrosion by the sea water below low tide by an anode electropositive to the steel structure, said steel piles each having a sheathing formed of a sheet of a metal resistant to corrosion by sea water, the said metal sheet extending around the steel pile with vertical ends welded together, the sheet extending vertically at least from the mean low-tide level up through the splash zone above the high-tide level, a steel band encircling each steel pile and lap-welded to the bottom portion of the said metal sheet, said steel band also being welded to the steel pile, whereby the said metal sheet is indirectly attached to the steel pile.

4. A steel structure adapted to stand partially immersed in sea water and having a protective sheathing formed of a sheet of a metal resistant to corrosion by sea water, the said metal sheet extending around the steel structure with vertical ends welded together, the sheet extending vertically at least from the mean low-tide level up through the splash zone above the high-tide level, a steel band encircling each steel structure and welded to the bottom portion of the said metal sheet, said steel band also being welded to the steel structure, whereby the said metal sheet is indirectly attached to the steel structure.

References Cited in the file of this patent

UNITED STATES PATENTS 2,454,956    Young ---------------- Nov. 30, 1948

UNITED STATES PATENT OFFICE
CERTIFICATE OF CORRECTION

Patent No. 2,791,096                                              May 7, 1957

Byron Benson Morton et al.

It is hereby certified that error appears in the printed specification of the above numbered patent requiring correction and that the said Letters Patent should read as corrected below.

Column 3, line 38, for "20% to 40% nickel" read -- 20% to 40% copper --.

Signed and sealed this 18th day of November 1958.

(SEAL)

Attest:
KARL H. AXLINE
Attesting Officer

ROBERT C. WATSON
Commissioner of Patents